United States Patent [19]

Wood et al.

[11] 4,040,309
[45] Aug. 9, 1977

[54] AUTOMATIC TWO-SPEED TRANSFER CASE

[75] Inventors: Gail E. Wood; Robert D. Dickmeyer, both of Fort Wayne, Ind.

[73] Assignee: International Harvester Company, Chicago, Ill.

[21] Appl. No.: 658,646

[22] Filed: Feb. 17, 1976

[51] Int. Cl.[2] .................. F16H 37/06; F16H 37/00; F16H 3/02; F16H 37/08
[52] U.S. Cl. .................. 74/665 T; 74/665 GE; 74/740; 74/745; 74/701; 184/6.12
[58] Field of Search ...... 74/665 F, 665 GA, 665 GD, 74/665 GE, 665 H, 665 S, 665 T, 665 K, 325, 333, 366, 369, 370, 700, 701, 740, 745

[56] References Cited

U.S. PATENT DOCUMENTS

| 2,331,908 | 10/1943 | Henningsen | 74/700 X |
| 2,344,388 | 3/1944 | Bixby | 74/700 X |
| 2,415,758 | 2/1947 | Peterson et al. | 74/700 X |
| 2,805,586 | 9/1957 | Lucas | 74/701 X |
| 2,853,890 | 9/1958 | Kelbel | 74/665 GA |
| 3,159,053 | 12/1964 | Engle | 74/701 |
| 3,788,164 | 1/1974 | Ojima | 74/665 T |
| 3,955,442 | 5/1976 | Kessmar | 74/665 GE |

FOREIGN PATENT DOCUMENTS

| 1,005,385 | 3/1957 | Germany | 74/665 GA |

*Primary Examiner*—Samuel Scott
*Assistant Examiner*—Lance W. Chandler
*Attorney, Agent, or Firm*—John P. O'Brien; Floyd B. Harman

[57] ABSTRACT

A transfer case assembly is disclosed as comprising two output shafts rotatably supported within the transfer case housing in a coaxially relationship and connected to the output hubs of a two-way roller clutch. The transfer case input shaft is rotatably supported within the housing in a parallel relationship to the output shafts. A chain drive sprocket is rotatably mounted on the input shaft directly coupled to the two-way roller clutch by an endless drive chain. A speed reduction unit is provided in the form of an intermediate shaft rotatably supported within the housing parallel to the input shaft and extending through the open middle loop area of the endless drive chain, and a gear cluster including a first drive gear rotatably mounted on the input shaft, a second larger drive gear fixed on the one end of the intermediate shaft in constant mesh with the first drive gear, and a third drive gear fixed on the other end of the intermediate shaft and in constant mesh with an integral gear portion of the chain drive sprocket. To selectively provide two-speed operation, a clutching means having two positions is provided for coupling the input shaft in a non-rotational relation to either the first drive gear or the chain drive sprocket.

8 Claims, 2 Drawing Figures

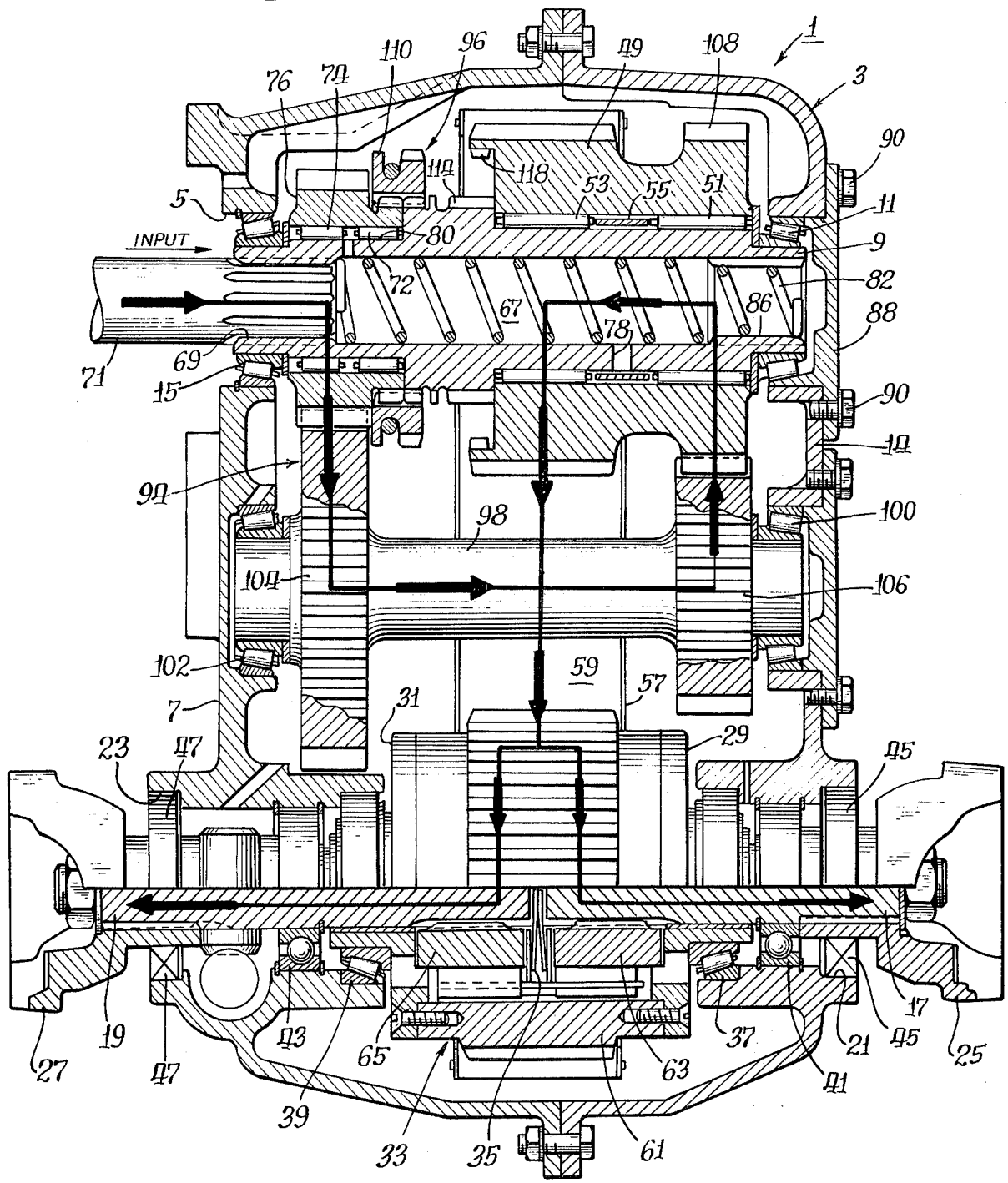

AUTOMATIC TWO-SPEED TRANSFER CASE

BACKGROUND OF THE INVENTION

This invention relates to transfer case assemblies. and, in particular, to two-speed transfer case assemblies.

The primary object of this invention is to provide a transfer case assembly capable of automatically driving all four wheels of a vehicle as the road traction surface demands. This invention utilizes a two-way roller clutch differential to automatically transmit torque to the slowest moving output propeller shaft while allowing the faster shaft to overrun. There is no known prior art device that utilizes a two-way roller clutch for this purpose.

Another object of this invention is to provide a transfer case assembly having an input shaft that can be used with motor vehicle main transmissions without the need for the special shafts, couplers, or adapters.

A further object of this invention is to provide an offset design of the output shafts relative to the input shaft to permit it to be used with short wheelbase vehicles.

A still further object of this invention is to use a compact two-speed gear cluster arrangement that utilizes the space between the chain drive for providing countershaft speed reduction.

SUMMARY OF THE INVENTION

A transfer case assembly constructed in accordance with the principles of this invention comprises a pair of output shafts rotatably supported in the transfer case housing in coaxial relation and coupled at their inner ends to a two-way roller clutch, an input shaft rotatably supported in the housing and in parallel relation to the output shafts and having a drive sprocket rotatably mounted thereon and connected to the two-way roller clutch by means of an endless chain. The transfer case assembly of this invention includes a speed reduction gear means having a first drive gear rotatably mounted on the input shaft, and clutching means having two positions for selectively coupling in a nonrotational relation the first drive gear to the input shaft when shifted into one of the positions and for selectively coupling in a non-rotational relation the drive sprocket directly to the input shaft when the clutching means is shifted to the other position.

DESCRIPTION OF DRAWINGS

For a better understanding of this invention, reference may be made to the accompanying drawings, in which:

FIG. 2 is a section view identical to FIG. 1 with the exception that the clutching means is shown in its second clutching position.

DESCRIPTION OF PREFERRED EMBODIMENT

Figure 1:
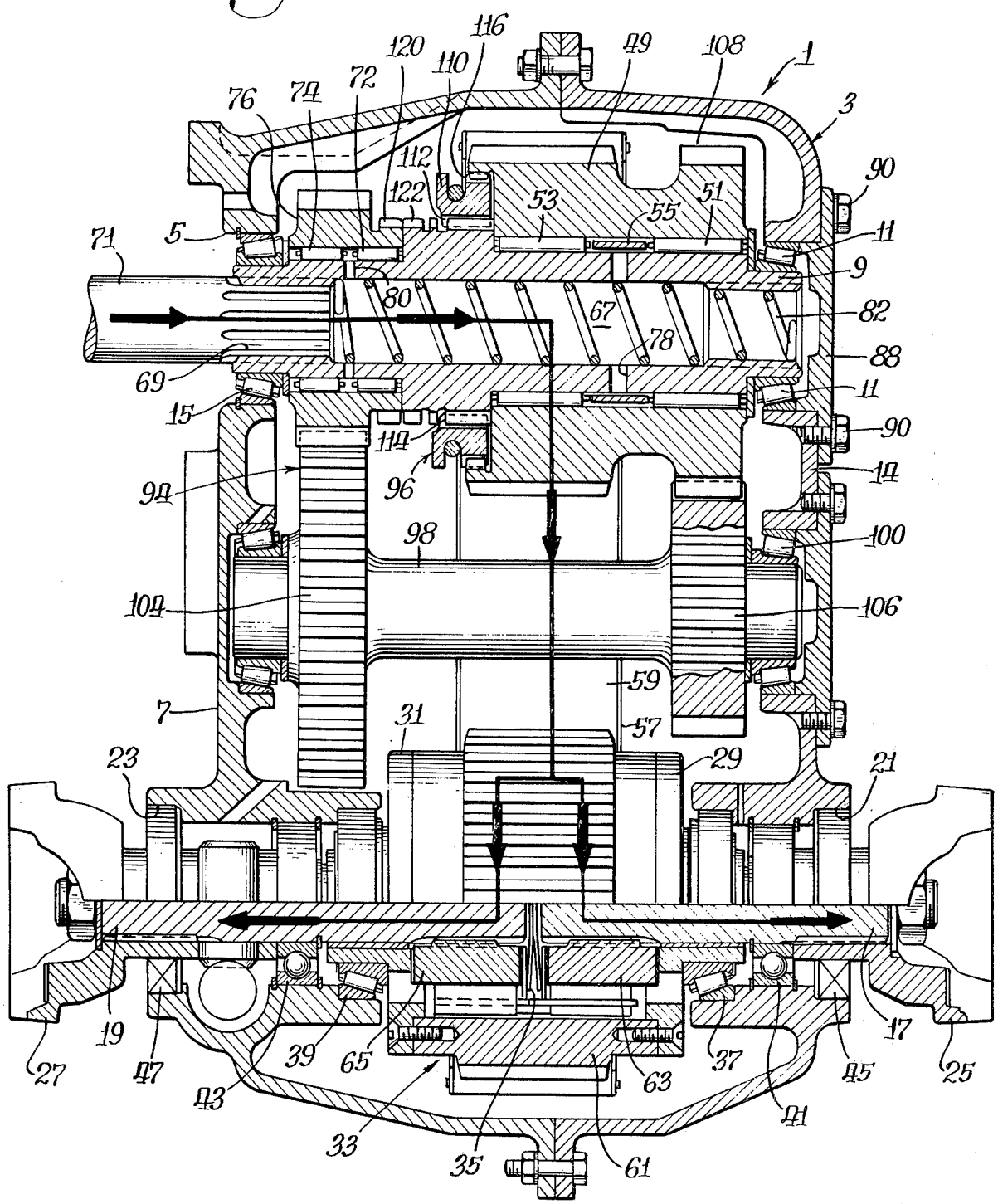
FIG. 1 is a section view of a transfer case assembly constructed in accordance with the principles of this invention.

Referring to the drawings, there is shown a transfer case assembly generally designated by the reference numeral 1 having a transfer case housing 3 in which an opening 5 is provided at the upper end of its front face 7 to provide access to the input shaft 9. Input shaft 9 is rotatably mounted at its opposite ends by roller bearing means 11 adjacent the rear wall 14 of the housing and bearing means 15 mounted in the opening 5.

A pair of output shafts 17, 19 are rotatably mounted in the bottom portion of the transfer case housing 3 in parallel relationship to input shaft 9. Output shaft 17 and 19 extend outwardly in opposite directions of the transfer case housing 3 through the aligned openings 21 and 23, respectively, and have yokes 25 and 27 fastened to their outer ends in a conventional manner. The inner ends of the output shaft 17 and 19 are coupled in a driving relationship to the pair of inner hubs 29 and 31, respectively, of two-way roller clutch differential 33.

Two-way roller clutch 33 is of conventional construction and could be any of a number of commercially available two-way roller clutches, such as Warn clutch assembly C100136 which is manufactured by Warn Industries of Portland, Ore. The inner hubs 63 and 65 are spaced apart by a Belleville spring 35, the end caps 29 and 31 are rotatably mounted by roller bearing means 37 and 39, respectively. The inner ends of output shafts 17 and 19 extend into the center bore of inner hubs 29 and 31 and are coupled thereto in a splined relationship. The intermediate portions of output shafts 17 and 19 are rotatably supported by second ball bearing means 41 and 43, respectively. Suitable seals 45 and 47 are provided in the casing openings 21 and 23, respectively, in a conventional manner.

A chain drive sprocket 49 is rotatably mounted on the input shaft 9 by means of the pair of roller bearings 51, 53 which are separated by spacer 55. A chain drive means 57 in the form of an endless chain drive belt 59 is disposed about the drive sprocket 49 and the outer drive member 61 of the two-way roller clutch 33. By virtue of this arrangement, the torque applied to the drive sprocket 49 drives the outer member 61 of the two-way roller clutch 33, which in turn distributes torque through two sets of hubs 63 and 65 to the output shafts 17 and 19, respectively. When operating in this manner the roller clutch 33 transmits torque to the slowest moving propeller output shaft while allowing the faster output shaft to overrun.

One of the novel features of this invention is to provide a center bore 67 extending the length of the input shaft 9 having an internal diameter larger than the outer diameter of a transmission's output shaft. The inner end of hollow input shaft 9 is formed with internal splines 69 for providing a spline connection with the vehicle's main transmission output shaft 71. To provide lubrication to the roller bearings 51, 53 of chain drive sprocket 49 and roller bearings 72, 74 of first drive gear 76, there is provided a lubrication flow path through bore 67 and outwardly of radial openings 78 and 80, respectively. The lubricating fluid is propelled up the central bore 67 by the turning of helical spring 82 which extends along the length of the shaft bore 67, as the input shaft 9 rotates.

The outer end of input shaft 9 is adapted to function as a PTO connection by virtue of internal splines 86 being formed at the end thereof. To use this end as a PTO connection all that is necessary is to remove the cover 88 by loosening its four mounting screws 90 and replace the cover 88 with a PTO assembly driven by internal splines of input shaft 9.

Two-speed operation is provided by the incorporation of a gear cluster 94 and clutching means 96. The gear cluster 94 utilizes an intermediate shaft 98 in parallel relationship with input shaft 9 that extends through the open loop portion of endless chain 59 and is rotatably mounted by the bearing means 100, 102 at its opposite ends. A second large drive gear 104 is fixed on one end of the intermediate shaft 98 and is in constant mesh with the first drive gear 76, which is rotatably supported on input shaft 9. A third drive gear 106 is fixed to the other end of intermediate shaft 98 and is in constant mesh with a gear portion 108 which is integrally formed on the drive sprocket 49.

The clutching means 96 comprises a circluar collar 110 which is slidably mounted on input shaft 9 for shifting between two positions. In the position shown in FIG. 1, the internally extending gear teeth 112 of collar 110 engage the complementary gear teeth 114 on input shaft 9, and the outwardly extending gear teeth 116 of collar 110 engage the internal gear teeth 118 formed at one end of drive sprocket 49 to cause the drive sprocket 49 to be directly connected to input shaft 9. In the other position, shown in FIG. 2, internal gear teeth 112 interfit with gear teeth 120 and 122 of the first drive gear 76 and input shaft 9, respectively, to couple the first drive gear directly to the input shaft. It will be appreciated that when the clutch collar 110 is positioned as shown in FIG. 2, input shaft 9 drives the first drive gear 76 to engage the gear cluster 94 for providing reduced speed to the drive sprocket 49 and simultaneously increasing the torque to the output prop shafts 17 and 19.

From the foregoing description it will be apparent that transfer case 1 can be selectively operated in two modes depending on the placement of clutching means 96. The placement of clutching means 96 is determined by an externally movable selector (not shown) that is operably connected to the clutch collar 110 in one of the manners well known in the art.

In FIG. 1 the shift collar 110 is shown for placing the transfer case operation in its high speed mode, where the shift collar 110 directly couples the output shaft of the transmission to the upper chain sprocket 49. The endless chain 59 then drives the outer member 61 of the two way roller clutch 33, distributing torque through the two way roller clutch 33, distributing torque through the two sets of hubs 63 and 65 to the respective output shafts 17 and 19. The two-way roller clutch operates to transmit the torque to the slowest moving output shaft while simultaneously permitting the faster shaft to overrun.

Referring to FIG. 2 there is shown the low speed mode in which the shift collar 110 couples the input shaft 9 to the first drive gear 76, and the first drive gear 76 in turn drives the larger second drive gear 104 to cause intermediate shaft 98 to turn at a reduced speed with respect to input shaft 9. The third drive gear 106 fixed to the other end of intermediate shaft 98 drives gear portion 108 of chain drive sprocket 49 to turn the entire chain drive sprocket and thereby turn outer member 61 of two-way roller clutch 33 at reduced speed with an increased torque distribution to the two output shafts 17 and 19.

By using a two-way roller clutch as the mechanism for distributing the torque to the two output shafts, maximum traction to all four wheels is provided automatically as is required and easy steering without the usual resistance encountered in turning the front wheels.

What is claimed is:

1. A transfer case assembly comprising a transfer case housing, two output shafts rotatably supported in said housing in a coaxial relation, an input shaft rotatably supported in said housing parallel to said output shafts, a two-way roller clutch disposed between said outer shafts with its two output hubs coupled to the adjacent ends of said two output shafts, a drive sprocket rotatably mounted on said input shaft, chain drive means for directly connecting said drive sprocket to the outer drive member of said two-way roller clutch, speed reduction gear means including a first drive gear rotatably mounted on said input shaft for reducing the speed and increasing the torque applied to said drive sprocket, and clutching means having two positions for selectively coupling in a non-rotational relation said first drive gear to said input shaft in one position and said drive sprocket directly to said input shaft in said second position.

2. A transfer case assembly as defined in claim 1, wherein said input shaft is formed with a cylindrical bore having an internal diameter larger than the outside diameter of a vehicle's main transmission output shaft and with internal splines at its inner end for receiving the splined end of the transmission's output shaft.

3. A transfer case as defined in claim 2, wherein said input shaft includes a plurality of radial lubricating ports at spaced intervals along said cylindrical bore and includes a helical spring extending along the length of said cylindrical bore for moving the lubricating oil axially as said input shaft rotates and outwardly through said lubricating ports.

4. A transfer case assembly as defined in claim 1, wherein said chain drive means comprises an endless chain disposed about said drive sprocket and said outer drive member of said two-way roller clutch, and said speed reduction gear means comprises an intermediate shaft rotatably supported within said housing parallel to said input shaft and extending through the open middle loop area of chain, a gear cluster having a second drive gear fixed on one end of said intermediate shaft in constant mesh with said first drive gear, a third drive gear fixed on the other end of said intermediate shaft, and said drive sprocket having an integral gear portion which is in constant mesh with said third drive gear.

5. A transfer case assembly comprising a transfer case housing, two output shafts rotatably supported in said housing in a coaxial relationship, a two-way roller clutch disposed between said output shafts with its two output hubs coupled to the adjacent ends of said two output shafts, an input shaft rotatably supported in said housing parallel to said output shafts, a drive sprocket rotatably mounted on said input shaft, endless chain disposed about said drive sprocket and the outer drive member of said two-way roller clutch, an intermediate shaft rotatably supported within said housing parallel to said input shaft and extending through the open middle loop area of said chain drive belt, a gear cluster including a first drive gear rotatably mounted on said input shaft, a second larger drive gear fixed on one end of said intermediate shaft in constant mesh with said first drive gear, a third drive gear fixed on the other end of said intermediate shaft, said drive sprocket having an integral gear portion in constant mesh with said third drive gear, and clutching means having two positions for selectively coupling in a non-rotational relation said first drive gear to said input shaft when shifted into one of said positions and for selectively coupling in a non-rotational relation said drive sprocket directly to said input shaft when shifted into the other of said positions.

6. A transfer case assembly as defined in claim 5, wherein said input shaft is formed with a cylindrical bore having an internal diameter larger than the outside diameter of a vehicle's main transmission output shaft and with internal splines at its inner end for receiving the splined end of the transmission's output shaft.

7. A transfer case as defined in claim 6, wherein said input shaft includes a plurality of radial lubricating ports at spaced intervals along said cylindrical bore and includes a helical spring extending along the length of said cylindrical bore for moving the lubricating oil axially as said input shaft rotates and outwardly through said lubricating ports.

8. A transfer case assembly as defined in claim 6, wherein said input shaft is formed with internal splines at its outer end for providing a power take-off connection, and wherein said transfer case housing is provided with a removable cover member directly in alignment with said outer end of said input shaft.

* * * * *